United States Patent [19]

Vossen, Jr.

[11] 4,077,051

[45] Feb. 28, 1978

[54] VIDEO DISC WITH A CONDUCTIVE LAYER HAVING AN OXYGEN CONTENT GRADIENT

[75] Inventor: John Louis Vossen, Jr., Bridgewater, N.J.

[73] Assignee: RCA Corporation, New York, N.Y.

[21] Appl. No.: 793,640

[22] Filed: May 4, 1977

[51] Int. Cl.$^2$ .................. H04N 1/28; B32B 3/02; B32B 15/08; B32B 15/20
[52] U.S. Cl. .................. 358/128; 179/100.1 B; 428/64; 428/626; 428/675
[58] Field of Search .................. 428/64, 65, 626, 675; 358/128; 179/100.1 B

[56] References Cited

U.S. PATENT DOCUMENTS

| | | | |
|---|---|---|---|
| 3,842,194 | 10/1974 | Clemens | 179/100.1 B |
| 3,842,217 | 10/1974 | Clemens | 179/100.1 B |
| 3,843,399 | 10/1974 | Kaplan et al. | 358/128 |
| 3,901,994 | 8/1975 | Mehalso et al. | 179/100.1 B |
| 3,909,517 | 9/1975 | Clemens | 179/100.1 B |
| 3,982,066 | 9/1976 | Nyman | 358/128 |
| 3,984,907 | 10/1976 | Vossen, Jr. et al. | 428/675 |
| 4,004,080 | 1/1977 | Vossen, Jr. et al. | 358/128 |

*Primary Examiner*—William J. Van Balen
*Attorney, Agent, or Firm*—H. Christoffersen; Birgit E. Morris; Joseph T. Harcarik

[57] ABSTRACT

This invention pertains to a video disc having a conductive bilayer thereon of a copper layer and a nickel/chromium/iron alloy layer wherein the alloy layer contains oxygen which decreases in content from the copper-alloy interface to an alloy-dielectric interface.

10 Claims, 2 Drawing Figures

VIDEO DISC WITH A CONDUCTIVE LAYER HAVING AN OXYGEN CONTENT GRADIENT

REFERENCE TO RELATED APPLICATIONS

This application is related to copending application "Method of Depositing a Silicon Oxide Dielectric Layer" by E. B. Priestley and P. J. Call Ser. No. 793,641; copending application "A Video Disc with a Dielectric Layer Formed from Styrene and Nitrogen" by G. Kaganowicz and J. W. Robinson Ser. No. 793,872; copending application "Method of Depositing a Lubricant Layer on a Video Disc" by A. D. Grubb and G. F. Nichols Ser. No. 793,643; and copending application "A Video Disc Capacitive Recording Means with a Conductive Bilayer" by J. L. Vossen Ser. No. 793,644, which applications where filed concurrently with this application on May 4, 1977 and are herein incorporated by reference.

BACKGROUND OF THE INVENTION

An audio/video information system for recording and playing back audio/video information has been described in U.S. Pat. Nos. 3,909,517; 3,842,194 and 3,842,217 to Clemens, herein incorporated by reference. According to this system, audio/video information is recorded in the form of geometric variations in a spiral groove on the surface of a disc. Disc replicas are then made of an insulating material such as vinyl and are coated, first with a conductive material, and then with a dielectric film. A metallized stylus is utilized as a second electrode forming a capacitor with the video disc. The audio/video information is monitored by the stylus which notes changes in capacitance between the stylus and the video disc as the geometric variations in the form of depressions pass under the stylus. The groove density of the video disc is generally from about 1000 to 10,000 grooves per inch (400–4,000 grooves per cm).

In one embodiment of this system, a polymeric dielectric layer is formed from styrene monomer which is deposited in a glow discharge, as described in U.S. Pat. No. 3,843,399 to Kaplan et al. While this dielectric coating is operative, it has been sought to improve the bonding between the polymeric dielectric layer and the conductive layer. In U.S. Pat. No. 3,982,066 to Nyman et al and in U.S. Pat. Nos. 3,984,907 and 4,004,080 to Vossen, Jr. et al, herein incorporated by reference, the adhesion of the polymeric dielectric layer to a conductive layer is improved by utilizing copper in the conductive layer at the dielectric interface. The copper is either employed as a separate layer interposed between a nickel/chromium/iron alloy layer and the polymeric layer or the copper is used to form a pseudo alloy with the nickel/chromium/iron alloy. While the copper improves adhesion it also increases the chance of degradation and instability.

SUMMARY OF THE INVENTION

This invention relates to a capacitive recording means comprising a disc having a spiral groove on a face thereof with video information in the form of geometric variations in said groove. A thin conductive bilayer film is disposed on the face of the disc having a first layer of copper and a second layer of an alloy of nickel and chromium which can contain up to about 10% by weight of iron and from about 5 to about 20 average atomic percent of oxygen. The oxygen content in the alloy forms a concentration gradient decreasing from the interface of the first and second layer to a polymeric dielectric layer interface. The dielectric layer is disposed on the conductive film in contact with the second layer. It has been found that by having an oxygen gradient such that the oxygen content is highest at the alloy-copper interface and lowest at the alloy-dielectric interface, the bonding between the polymeric dielectric layer and the conductive layer is improved. Better corrosion resistance of the recording means and stress relief of the alloy layer is also obtained.

DETAILED DESCRIPTION OF THE INVENTION

Figure 1:
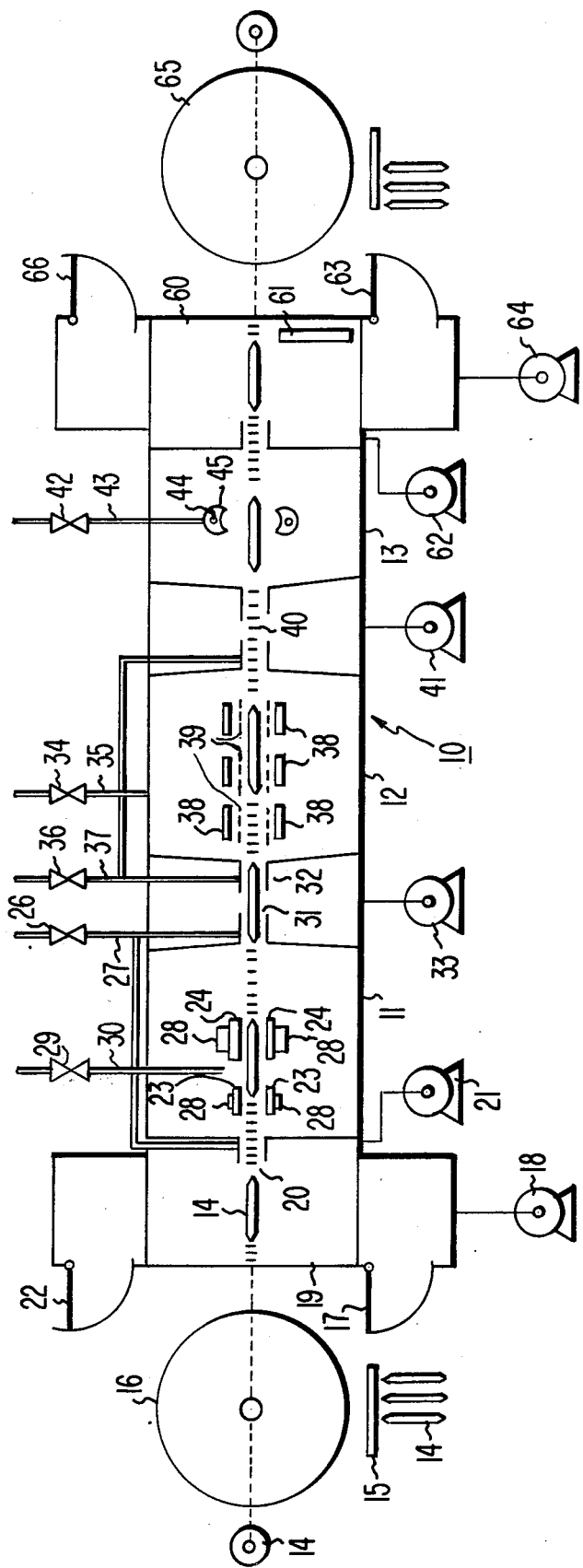
FIG. 1 is a schematic illustration of an apparatus for vacuum depositing first a conductive layer, a dielectric layer and then a lubricant layer on a vinyl disc containing geometrically coded audio/video information.

A disc containing geometrically coded audio/video information is first prepared in a manner described in the Clemens' patents. Suitably, the disc material is a vinyl such as polyvinyl chloride. A conductive layer is then deposited onto the vinyl disc. The layer is a bilayer of a first layer of copper about 20 to about 50 angstroms thick and a second layer of an alloy of nickel and chromium which can contain up to about 10% by weight of iron and from about 5 to about 20 average atomic percent of oxygen.

Atomic percent employed in the specification and in the Claims is defined as that measured by Auger electron spectroscopy as described in more detail in the above mentioned U.S. Pat. No. 3,982,066.

According to the present invention, the oxygen is introduced into the nickel/chromium/iron alloy layer so that the oxygen content is greatest at the interface with the first copper layer and decreases towards the interface with the polymeric dielectric layer. It is believed that the oxygen is needed in the alloy layer in order to provide for stress relief of the bimetal coating and to prevent corrosion. However, for strong bonding to take place between the chromium/nickel/iron alloy layer and the polymeric dielectric layer, unreacted metal is needed to produce electrostatic bonds at the interface. The oxygen which ties up the unreacted metal and, hence, decreases the bonding at this interface. It is believed that by providing for an oxygen gradient in the nickel/chromium/iron alloy layer, sufficient oxygen can be introduced to allow for stress relief and corrosion resistance and also allow for sufficient unreacted metal at the polymeric dielectric interface to provide for strong bonding.

The metal layers are deposited on the vinyl disc by sputtering from metal cathode pairs in a vacuum chamber as the disc passes between the cathodes. To sputter the metals a glow discharge in argon gas is created by supplying current to the cathodes. Ions from the glow discharge in a planar magnetron configuration strike the metal cathodes ejecting metal atoms. As the vinyl disc passes between the cathodes the metal atoms collect on the vinyl disc forming metal layers. A first pair of copper cathodes is employed for depositing the copper layer and a second pair of cathodes of nickel/chromium/iron alloy cathodes are employed for depositing the second layer. The oxygen gradient is obtained by introducing oxygen into the vacuum chamber at a position where the vinyl disc first begins to pass through the nickel/chromium/iron alloy cathodes. This creates a high concentration of oxygen gas near the portion of the alloy cathodes which deposits closest to the copper layer. Correspondingly, a high oxygen concentration in the portion of the alloy layer deposited near the copper layer is obtained. As the vinyl disc proceeds through the cathode pair the amount of oxygen decreases and the amount of oxygen in the deposited layer also decreases. Thus an oxygen concentration gradient is produced in the deposited alloy layer. The peak value of oxygen at the copper-alloy interface is suitably from about 10 to about 35 atomic percent. Suitably, the copper layers are approximately 20 to 50 angstroms thick and the deposited nickel/chromium/iron alloy layers are about 100 to 400 angstroms thick.

After the conductive layer has been deposited, a polymeric dielectric layer is deposited in a glow discharge. A suitably polymeric dielectric layer is a layer deposited from a styrene monomer and nitrogen gas as described in the above-mentioned copending application to Kaganowicz et al. The amount of nitrogen in the deposited layer is suitably from about 2 to about 12 atomic percent and the dielectric layer is from about 50 to about 500 angstroms thick.

After the dielectric layer has been deposited a lubricant layer may be deposited in accordance with the manner described in the above-mentioned copending application to Grubb et al. The lubricant layer is a methyl alkyl siloxane compound having the formula

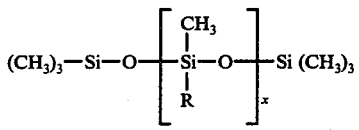

wherein $R$ is an alkyl group of from 4 – 20 carbon atoms and $x$ is an integer. These lubricants are described more fully in U.S. Pat. No. 3,833,408 to Matthies herein incorporated by reference. Since the metal layers, dielectric layers and lubricant layers may be deposited under vacuum conditions in a continuous manner, a single vacuum chamber may be employed for depositing all of the layers which allows for rapid processing of the video disc.

FIG. 1 is a cross-sectional top view which schematically illustrates a vacuum chamber 10 which is divided into three connecting evacuated chambers; a metal deposition chamber 11, a dielectric deposition chamber 12, and an oil lubricant deposition chamber 13. Vinyl disc replicas 14 containing geometrically coded audio/video visual information are first assembled onto racks 15 by a disc assembler 16. The disc replicas 14 are then transported into the vacuum chamber 10 via an inlet pressure lock 17. As the vinyl discs 14 proceed through the inlet pressure lock 17, the pressure is reduced by means of a pump 18 to about 10 to 50 millitorr. This approximately equalizes the pressure in the inlet pressure lock 17 with the vacuum chamber 10 which is maintained at about 3 to 12 millitorr during operation. The vinyl discs 14 are then transported into a loading area 19 where the discs are taken from the racks 15 and loaded singly in a vertical position on a continuously moving conveyor belt 20 which advances about 0.2 feed (6 cm) per second. The vacuum in the loading area 19 is maintained by a pump 21. The racks 15 are removed from the loading area 19 by way of an exit pressure lock 22 after pressure in the lock 22 has been equalized with atmospheric pressure.

The video discs 14 which have been loaded onto the conveyor belt 20 are conveyed into the metal deposition chamber 11 where metal layers are sputtered onto both sides of the vinyl discs 14. The coated metal layer consists of a bilayer of a copper layer and a nickel/chromium/iron alloy layer. To deposit the bilayer, the vinyl discs 14 first pass between a pair of copper cathodes 23 which are about 4 inches (10 cm) by 14 inches (36 cm) in size and about 4 inches (10 cm) apart and then pass between a pair of nickel/chromium/iron alloy cathodes 24 which are about 14 inches (36 cm) × 29 inches (74 cm) in size and about 10 inches (25.4 cm) apart.

During sputtering a total of about 220 standard cubic centimeters per minute (sccm) of argon gas is introduced through a valve 26 and a line 27. About 130 sccm of argon gas is introduced at the inlet of chamber 11 and about 90 sccm is introduced at the chamber exit. The pressure in the metal glow discharge 11 is maintained at about 4 to about 8 microns. A glow discharge in the argon gas is created by supplying a current to the cathodes 23 and 24. Ions from the glow discharge are created by collision of glow discharge electrons with neutral argon gas atoms which are confined by means of magnetrons 28. The ions strike the metal cathodes ejecting metal atoms. The metal ions collect on the vinyl discs 14 forming metal layers. The copper layers are approximately 25 to 50 angstroms thick and the nickel/chromium/iron alloy layers are about 100 to 400 angstroms thick. In order to produce stress-free corrosion resistant films of nickel/chromium/iron alloy, oxygen is added through a valve 29 in a line 30 to produce a film containing 5 to 20 atomic percent of oxygen in the alloy. The oxygen is introduced at a rate of about 20 to about 100 sccm. According to the present invention the oxygen is introduced at a point where the vinyl discs 14 move towards the alloy cathodes 24 as shown in FIG. 1. Preferably the point of introduction is about 3 inches (7.6 cm) from the alloy cathodes 24. This will produce a peak value of oxygen in the nickel/chromium/iron alloy film of about 10 to 35 atomic percent at the copper layer-alloy layer interface.

The vinyl discs 14 are then conveyed through a 2 inch (5 cm) wide tunnel 31 formed from metal sheets 32 onto the dielectric chamber 12. A low pressure is maintained in this tunnel by means of a vacuum pump 33 which minimizes cross-contamination of the gases in the metal deposition chamber 11 with the gases of the dielectric chamber 12. Suitably, the dielectric layer is prepared from styrene monomer and nitrogen which is deposited in a glow discharge. The styrene, as styrene monomer, is added through a valve 34 and a line 35 and nitrogen is also supplied through a valve 36 and a line 37. A glow discharge is then created by supplying an electrical current to pairs of screen electrons 39 and the discharge is confined by magnets 38. The glow discharge activates the styrene monomer which copolymerizes with the nitrogen at the surface of the discs 14. Radio frequency current of about 1 ampere power is supplied to each of the electrodes at a power of about 470 to about 1800 watts. The deposited dielectric layers are suitably about 100 to about 400 angstroms thick and contain from about 2 to about 12 atomic percent of nitrogen. After the vinyl discs 14 are coated with the dielectric layer they are conveyed into the oil lubricant deposition chamber 13 through a second tunnel 40. The tunnel 40 is maintained at a low pressure by means of a vacuum pump 41 to prevent cross-contamination of the gases from the dielectric deposition chamber 12 with the gases of the lubricant deposition chamber 13. The lubricant oil to be deposited is added through a valve 42 and a line 43. The oil is vaporized in an oil vaporizer 44 by contacting the oil with the hot surface at about 250° C. As the oil vaporizes it diffuses from the hot surface and is then directed towards the video discs 14 by means of a perforated vapor distributor 45. As the oil vapor contacts the discs 14 it condenses on the disc surface forming a thin uniform lubricant layer. The rate of oil vaporization, the geometry of the oil distributor 45, the pressure in the chamber 13, and the rate at which the video discs 14 pass through the oil distributor 45 control the thickness of the oil lubricant layer. Suitable lubricant layer thicknesses are from about 90 to about 400 angstroms and preferably about 180 to about 230 angstroms.

The video discs 14, now coated with a metal layer, a dielectric layer, and a lubricant oil layer, are conveyed into a disc collection area 60 where they are removed from the conveyor belt 20 and assembled onto racks 61. A vacuum in the disc collection area 60 is maintained by means of a pump 62. The racks 61 and the vinyl discs 14 are then transported through an outlet pressure lock 63 which has been evacuated by means of pump 64. The video discs 14 and the racks 61 are removed from the vacuum chamber 10 after the outlet pressure lock 63 is brought to atmospheric pressure. A disc assembler 65 removes the vinyl discs 14 from the racks 61 and the racks 61 are returned to the vacuum chamber 10 by way of an inlet pressure lock 66.

The following Examples are presented to further describe this invention but it is not meant to limit the invention to the details described therein.

EXAMPLE 1

In this Example vinyl disc replicas each approximately 30.5 cm in diameter and containing geometrically coded audio/video information in a spiral groove (5,555 grooves per inch — 2,200 grooves per cm) were coated with conductive layers, dielectric layers and lubricant layers utilizing an apparatus as shown in FIG. 1. The vinyl discs were coated at a rate of 720 per hour. The deposited conductive layer was a bilayer consisting of a first copper layer about 50 angstroms thick and a second layer of an alloy of Inconel (76.8% nickel, 13.8% chromium and 8.5% iron) about 200 angstroms thick. The metal deposition chamber was maintained at 6 millitorr pressure, the copper cathodes were activated with 450 volts and 1.4 amperes of current and the magnetrons maintained a field of 330 gauss. The Inconel electrode was activated with 540 volts and 17.5 amperes of current.

The oxygen was introduced at a rate of about 65 sccm and at a point about 4 inches from the Inconel electrodes as shown in FIG. 1. This produced an Inconel layer containing an oxygen content of about 7 atomic percent and a peak oxygen content of about 11 atomic percent at the Inconel-copper interface.

In the dielectric chamber, nitrogen was first introduced to obtain a pressure of about 4.3 millitorr and styrene monomer was introduced to increase the pressure to about 6.5 millitorr. The electrodes were supplied with 1.0 ampere and maintained at 470 volts. The screen density was 30%. The deposited dielectric layer contained about 5 atomic percent of nitrogen and the layer was 225 angstroms thick.

In the lubricant chamber a lubricant was added to the vaporizer at the rate of 6 ml/hour. The lubricant was a silicon compound having a viscosity of about 49.0 centistokes at 25° C and a specific gravity of 0.89 and having the formula

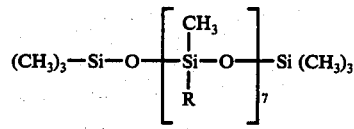

wherein R is a decyl group. The vaporizer was maintained at a temperature of about 250° C and the lubricant chamber was maintained at about 5 millitorr. The deposited lubricant layer was about 180 angstroms thick.

Coated vinyl discs were then repeatedly played back by contacting the rotating discs with a stylus as described in Clemens. After 100 playbacks the video disc continued to function properly producing audio/video information.

Figure 2:
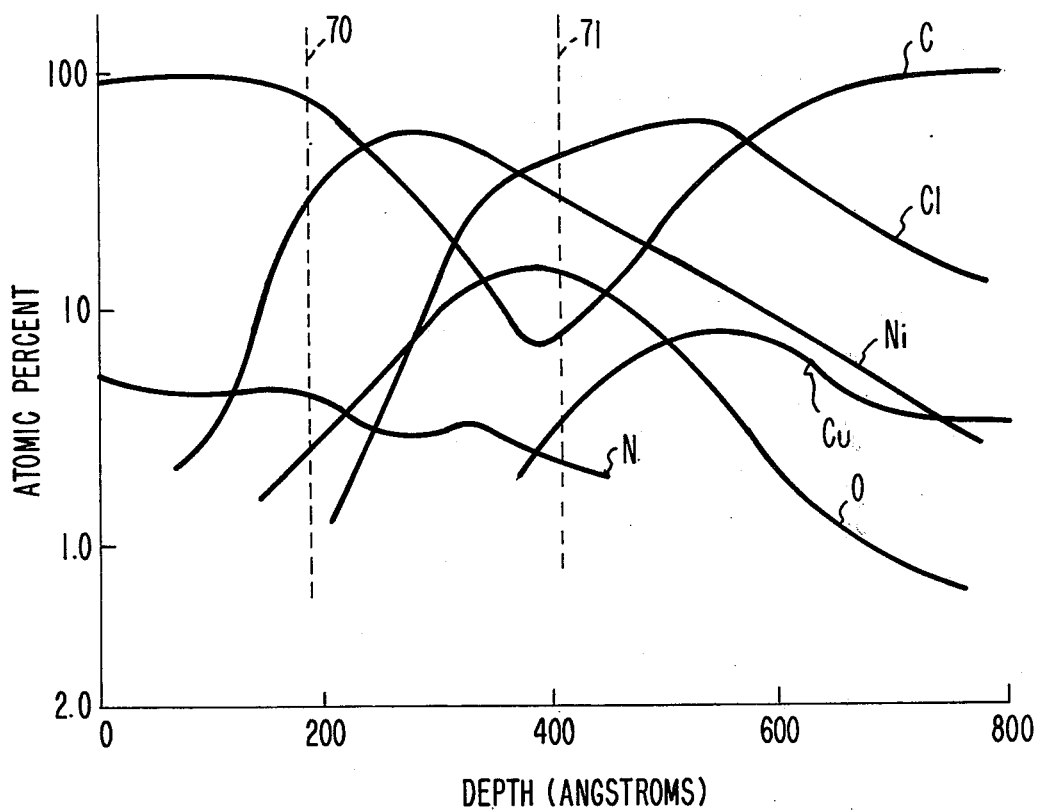
FIG. 2 is a graph of the atomic percent of the elements in a film of the invention as a function of sputter etched depth.

FIG. 2 is a graph of elements in the deposited layers of a vinyl disc versus sputter etch depth as determined by Auger analysis and based on the sputtering rate of tantalum pentoxide. Line 70 is the dielectric-nickel alloy interface and line 71 is the nickel alloy-copper interface, which interfaces have been defined as surfaces containing 50% of the peak value of nickel.

CONTROL

This Example is presented as a control. The procedure of Example 1 was essentially followed except that the oxygen was inroduced into the chamber at tunnel 31. This produced a more even distribution of oxygen around the Inconel electrode and hence produced a deposited Inconel layer containing a more uniform distribution of oxygen with a peak oxygen content near the center of the deposited alloy layer. It was found upon repeated playbacks of these discs that the bonding between the Inconel and the dielectric layer was weak and caused failure of the records after about 20 playbacks.

We claim:
1. A capacitive recording means comprising:
    a. a disc having a spiral groove on a surface thereof with video information in the form of geometric variations in said groove;
    b. a thin conductive bilayer film disposed on said surface of the disc having a first layer of copper and a second layer of an alloy of nickel and chromium which contains up to about 10% by weight of iron; and
    c. a polymeric dielectric layer disposed on the conductive film wherein the alloy layer contains from about 5 to about 20 average atomic percent of oxygen and the oxygen content forms a concentration gradient decreasing from the interface between the copper layer and the alloy layer to the interface between the alloy layer and the polymeric dielectric layer.

2. A capacitive recording means according to claim 1 wherein the maximum oxygen content in the alloy layer is from about 10 to about 35 atomic percent.

3. A capacitive recording means according to claim 1 wherein the copper layer is about 25 to about 50 angstroms thick.

4. A capacitive recording means according to claim 1 wherein the alloy layer is about 100 to about 400 angstroms thick.

5. A capacitive recording means according to claim 1 wherein the alloy layer contains about 76.8 percent by weight nickel, about 13.8 percent by weight chromium, and about 8.5 percent by weight of iron.

6. A capacitive recording means according to claim 1 wherein the dielectric layer is from about 50 to about 500 angstroms thick.

7. A capacitive recording means according to claim 1 wherein the dielectric layer is formed from styrene and nitrogen in a glow discharge.

8. A capacitive recording means according to claim 1 wherein a lubricant layer is deposed over the dielectric layer.

9. A capacitive recording means according to claim 8 wherein the lubricant layer is a methyl alkyl siloxane compound having the formula

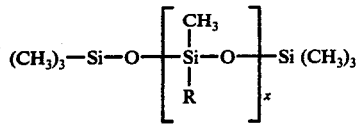

wherein R is an alkyl group of 4 – 20 cartons atoms and $x$ is an integer.

10. A capacitive recording to claim 8 wherein the lubricant layer is about 90 to about 400 angstroms thick.